Oct. 23, 1956   O. W. NEUMANN   2,767,976
SNUBBED SPRING GROUP
Filed Jan. 8, 1951   2 Sheets-Sheet 2

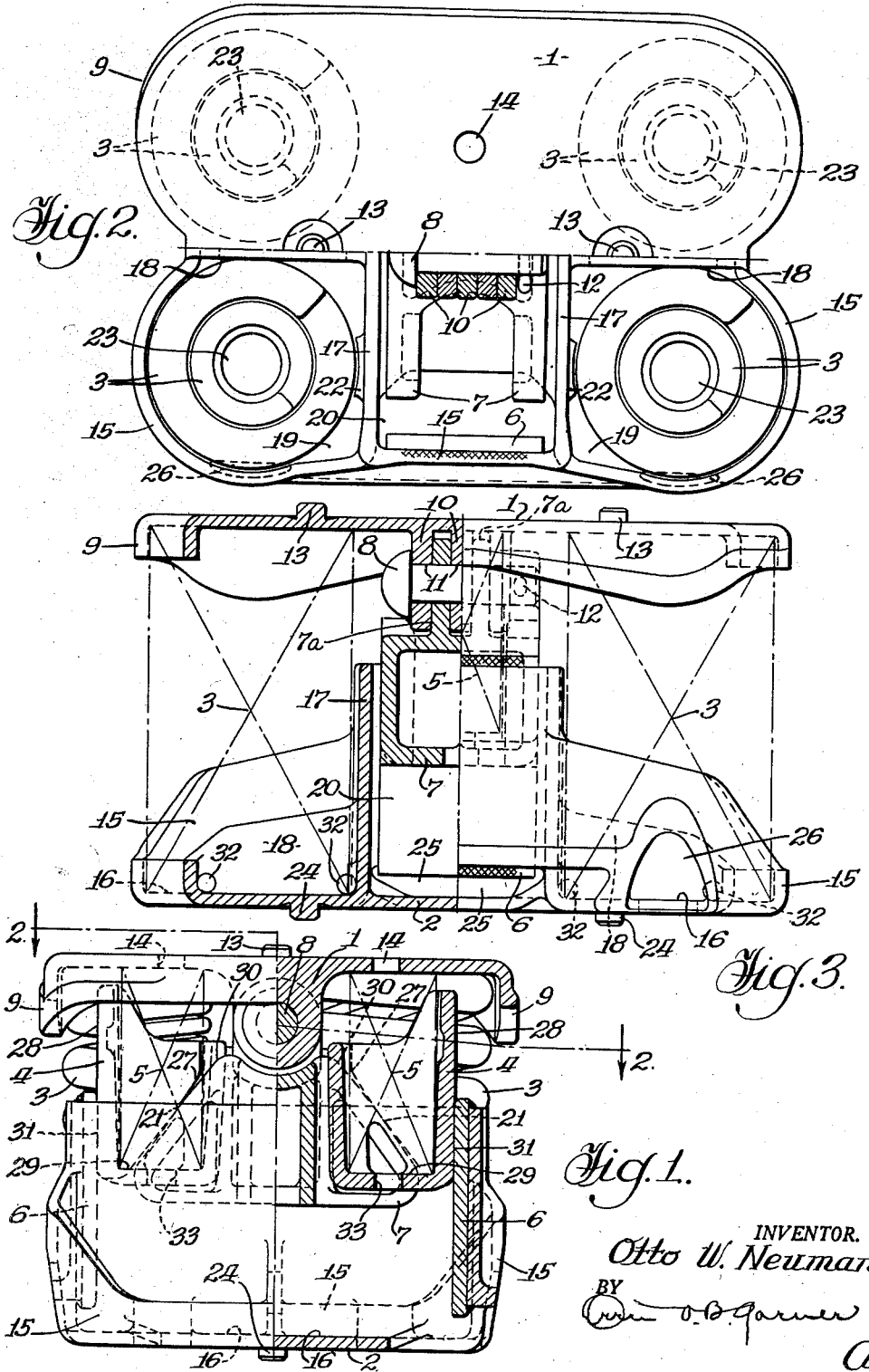

INVENTOR.
Otto W. Neumann
BY
Atty.

United States Patent Office 2,767,976
Patented Oct. 23, 1956

2,767,976

SNUBBED SPRING GROUP

Otto W. Neumann, Chicago, Ill., assignor to American Steel Foundries, Chicago, Ill., a corporation of New Jersey Application January 8, 1951, Serial No. 204,909

12 Claims. (Cl. 267—9)

This invention relates to a spring group for a railway car truck, and more particularly to a composite type of spring group with a plurality of coil springs, together with a friction device to arrest the undesirable or damaging oscillations thereof.

My invention is in a form particularly suitable for application to railway freight car trucks, and especially devised for application to so-called long travel spring trucks which give a more effective cushioning than obtainable with short travel spring trucks.

The principal object of my invention is to integrate a friction device with a simple spring group and develop a frictional resistance therein to arrest undesirable or damaging vibratory motions of the railway car.

Another object of my invention is to obtain a substantially constant frictional resistance in any position of the stroke of the spring group, and in either direction thereof.

A further object of my invention is to automatically obtain a continuously firm coplanar engagement of the friction shoes and friction panels, notwithstanding the wearing away of metal at these coplanar surfaces.

In the drawings:

Figure 1 is a half-sectioned end elevation view of my novel spring group.

Figure 2 is a sectional view on the line 2—2 of Figure 1, with the friction shoe and its actuating spring in the lower half of the figure removed.

Figure 3 is a half-sectioned side elevation view taken from the right as seen in Figure 1.

Figure 6:
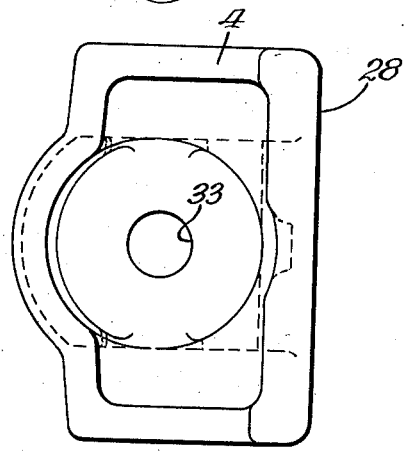
Figure 5:
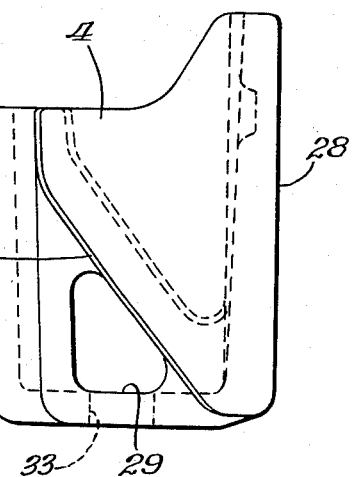
Figure 7:
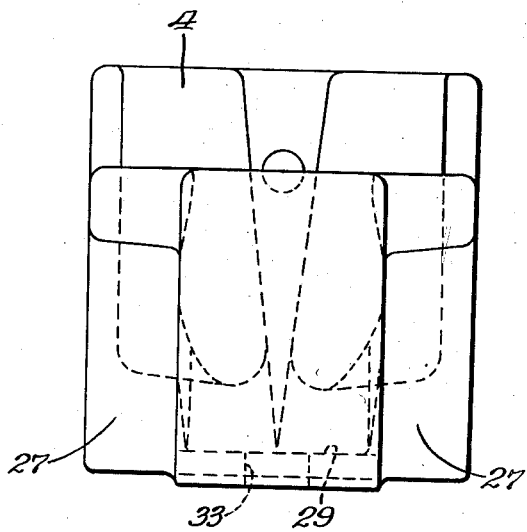

Figures 5, 6, and 7 are side elevation, top plan and rear elevation views, respectively, of one friction shoe.

Referring first to the illustrations shown in Figures 1, 2, and 3, my novel spring group is comprised of a top plate designated by numeral 1, a bottom plate 2, coil springs 3 interposed and seated therebetween, and a friction device comprising friction shoes 4, auxiliary springs 5, friction panels 6, and a wedge block 7 pivotally secured by the pin 8 in the spaced bearing lugs 10 on the under surface of top plate 1.

The top plate or follower 1, with an apron indicated by 9 extending about the perimeter thereof, is supported by the coil springs 3, seated against the underside thereof. Merging into the underside of said top plate are the spaced bearing lugs 10, provided with equal concentric holes at 11 for a slip fit with pin 8. The pivotal wedge block 7 comprises lug portions or members 7a in interlaced engagement with the spaced lugs 10 by means of pin 8 to form an articulated joint or pivotal connection between the wedge block and the top plate. Thus it is seen that the wedge movably depends pendulum-like from the top plate and a hinge-like connection is provided therebetween. Said pin is secured at its end by cotter pin 12. If desired the pin 8 may be provided with a resilient bushing (not shown) in openings 11 to afford a universal connection. Protruding from the top surface of the top plate at 13 are bolster locating pins. Cored into the top plate are holes 14 for a purpose hereinafter described.

The bottom plate or follower 2 is provided with upturned flanges 15 extending about the perimeter thereof, and is sectionalized by vertical walls 17 and 18 which merge with the flanges 15 to form compartments 19 (Figure 2) for coil spring isolation. The coil springs are seated at the bottom surfaces 16 in said compartments. Protruding into said compartments for spring seat positioning are shoulders or pads 22 of the walls 17. A central compartment 20 is also formed by the merger of walls 17 and 15. Said compartment 20 partially houses the friction device hereinafter described.

Secured to the inside vertical surfaces of walls 15 are the spaced friction panels 6 of the friction device. Protruding from the outside surfaces of the bottom plate are side frame locating pins 24. Cored into the bottom plate are drain holes and openings as at 23, 25, 26, and 32. The friction shoes 4, with plane vertical friction surfaces 28 and spring seats 29, are in coplanar engagement with the respective spaced friction panels at 31, and present wedge surfaces at 27 (see Figures 5, 6, and 7) for wedge block engagement as at 21. The wedge block 7, as noted above, is pivotally connected to the bearing lugs 10 on the underside of the top plate by the pin 8. Said wedge block presents diverging plane surfaces 30 in engagement with the arcuate surfaces 27 of the friction shoes 4 which are actuated by the auxiliary coil springs 5 to urge the friction shoes in continuous engagement with the spaced friction panels and wedge block.

Figure 4:
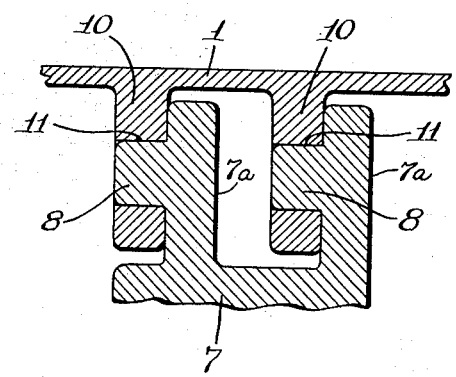
Figure 4 is a fragmentary sectional view showing a modified connection between the wedge block and top spring plate.

The modified connection shown in Figure 4 comprises the top plate 1 and wedge block 7. Merging into the underside of said top plate are the spaced bearing lugs 10 which are provided with equal concentric holes at 11 for a slip fit with the pins 8 protruding from the portions or members 7a of the wedge block.

Figures 5, 6 and 7 illustrate one of the friction shoes 4 shown in Figure 1. In these figures numeral 28 indicates the plane vertical friction surface that is in coplanar engagement with the friction panel as at 31 (Figure 1); numerals 27 indicate the arcuate surfaces for wedge block engagement as at 21, and numeral 29 indicates the seating surface for auxiliary coil spring 5.

The holes 14 (Figure 1) in the top plate 1 and the opposing holes 33 in the friction shoes 4 accommodate detachably fastened bolts and nuts (not shown) to compress the auxiliary springs 5, thus facilitating the assembly of the friction device.

Undesirable and damaging oscillations of the spring group are arrested by the resisting frictional forces developed between the coplanar sliding plane surfaces 28 of the friction shoes 4 and friction panels 6. The friction shoes are urged to firmly engage the friction panels by the action of pre-loaded (compressed) auxiliary springs 5 disposed between the bottom surface of the top plate and the seating surfaces in the friction shoes. The friction shoes 4 are constrained to coplanar sliding engagement with their respective friction panels, notwithstanding an oblique relationship between the top and bottom plates of the spring group. This is facilitated by the pivotal connection between the top plate 1 and wedge block 7, by the rocking of the arcuate surfaces 27 of the friction shoes on the plane diverging surfaces 30 of the wedge block 7, by the action of the compressed auxiliary springs 5, and also by an unobstructed space allowed between the parallel vertical sides of the wedge block and adjacent walls 17.

I claim:

1. A spring group comprising a top plate with a plurality of spaced bearing lugs on the underside thereof; a bottom plate; a plurality of coil springs interposed between said plates; a friction device comprising spaced friction panels secured to said bottom plate, a plurality of friction shoes, each having arcuate surfaces and having a plane vertical friction surface in coplanar engagement with the related friction panel, a wedge block having diverging plane surfaces in engagement with the arcuate surfaces of respective friction shoes, a plurality of compressed auxiliary coil springs interposed between said top plate and said friction shoes, respectively, and pin means pivotally connecting said wedge block to said bearing lugs.

2. A spring group comprising a top plate; a bottom plate; a plurality of coil springs interposed between said plates; a friction device comprising spaced friction panels secured to said bottom plate, a plurality of friction shoes, each having wedge surfaces and a plane vertical friction surface in coplanar engagement with the related friction panel, a wedge block having diverging surfaces in engagement with the wedge surfaces of respective friction shoes, a plurality of compressed auxiliary coil springs interposed between said top plate and said friction shoes, respectively, and a pivotal pin integrated with said top plate and said wedge block affording a rotary connection therebetween.

3. A spring group comprising top and bottom plates; a plurality of coil springs interposed between said plates; a friction device comprising spaced friction panels connected to one of the plates, a plurality of friction shoes, each having wedge surfaces and having a plane vertical friction surface in coplanar engagement with the related friction panel, a wedge block having diverging plane surfaces in engagement with the wedge surfaces of respective friction shoes, compressed resilient means for actuating said friction shoes, a pivotal connection between the wedge block and the other of said plates, said connection being operative to accommodate angling between the other plate and the block on an axis lying in a horizontal plane.

4. A friction device comprising two spaced followers; spaced friction panels on one of said followers; a plurality of friction shoes, each having wedge surfaces and a plane vertical friction surface in coplanar engagement with the related friction panel; a wedge block having a pivotal connection to the other of said followers and presenting diverging plane surfaces in engagement with the wedge surfaces of said friction shoes, said pivotal connection being operative to accommodate angling of said followers out of parallel relation to each other without disturbing the position of the wedge block relative to the shoes, and compressed resilient means interposed between the shoes and said other follower urging said shoes in continuous engagement with said spaced friction panels and wedge block.

5. In a friction device having spaced followers, spring means resiliently interconnecting said followers, friction shoe means in frictional engagement with one of said followers, wedge means engaging said friction shoe means, pivotal pin connection means connecting said wedge means to other of said followers, said connection means accommodating angling between said followers without affecting the position of said shoe means and wedge means relative to said one follower, and actuating means cooperating with said wedge means and other follower to maintain said friction means in frictional engagement with said one follower.

6. A friction device comprising top and bottom followers; spaced friction panels on said bottom follower; a plurality of friction shoes, each having wedge surfaces and a plane vertical friction surface in coplanar engagement with the related friction panel; a wedge block presenting diverging surfaces in engagement with the wedge surfaces of said friction shoes, a pin having its longitudinal axis disposed horizontally pivotally connecting the wedge block to the top follower, and compressed auxiliary coil springs interposed between the top follower and the shoes urging said shoes in continuous engagement with said spaced friction panels and wedge block.

7. A spring group comprising a top plate with a plurality of spaced bearing blocks thereunder; a bottom plate with open compartmental housings; a plurality of coil springs seated between said plates and contained within certain of said compartmental housings in the bottom plate; a friction device, housed in another of said compartments, said device comprising spaced friction panels secured to said bottom plate, a plurality of friction shoes, each having arcuate surfaces and having a plane vertical friction surface in coplanar engagement with the related friction panel, a wedge block having diverging plane surfaces in engagement with the arcuate surfaces of related friction shoes, a plurality of compressed auxiliary coil springs interposed between said top plate and said friction shoes respectively, and pin means pivotally connecting said wedge block to said bearing blocks.

8. A spring group comprising a top plate; a bottom plate with open compartmental housings; a plurality of coil springs seated between said plates and contained within certain of said compartmental housings; a friction device, isolated and housed by another of said housings, comprising spaced friction panels secured to said bottom plate, a plurality of friction shoes, each having arcuate surfaces and a plane vertical friction surface in coplanar engagement with the related frictional panel, a wedge block having diverging plane surfaces in engagement with the arcuate surfaces of related friction shoes, a plurality of compressed resilient means interposed between one of said plates and said friction shoes respectively, and an integrated pivotal connection between one of said plates and wedge block affording limited rotary movement of the wedge block about a particularly defined axis extending transversely of the group.

9. A spring group comprising a top plate with a plurality of spaced bearing blocks thereunder; a bottom plate with open compartmental housings; a plurality of coil springs seated between said plates and contained within certain of said compartmental housings; a friction device, isolated and housed by another of said housings, said device comprising spaced friction panels secured to said bottom plate, a plurality of friction shoes, each having arcuate surfaces and a plane vertical friction surface in coplanar engagement with the related friction panel, a wedge block with a plurality of pins pivotally engaged with said bearing blocks, said block presenting diverging plane surfaces in engagement with the arcuate surfaces of related friction shoes, and a plurality of compressed auxiliary coil springs interposed between said top plate and said friction shoes respectively.

10. A spring group comprising top and bottom plates with a pluraltiy of spaced bearings blocks on the inside of one of said plates; a plurality of coil springs interposed between said plates; a friction device comprising spaced friction panels secured to one of said plates, a plurality of friction shoes, each having arcuate surfaces and a plane vertical friction surface in coplanar engagement with the related friction panel, a wedge block with a plurality of pins pivotally engaged with said bearing blocks, said block presenting diverging plane surfaces in engagement with the arcuate surfaces of related friction shoes, and a plurality of compressed resilient means interposed between one of said plates and said friction shoes respectively.

11. In a spring group, spaced resiliently interconnected plates, a friction device disposed therebetween, said device comprising a friction surface rigidly fixed on one of said plates, a friction shoe cooperating therewith, a pendulum-like wedge pivoted to the other of said plates for movement about an axis parallel to the plane of said plate, said wedge engaging said friction shoe, a spring interconnecting said other plate and said shoe and urging said shoe into engagement with said wedge and said friction surface, and actuating means cooperating with said wedge and said other plate to maintain said friction shoe in engagement with said wedge and said friction surface.

12. In a spring group, spaced resiliently interconnected plates, a friction device disposed therebetween, said device comprising friction surfaces rigidly fixed on one of said plates, friction shoes cooperating with said surfaces to dampen relative movement between said plates, a pendulum-like wedge pivoted to the other plate for movement about an axis parallel to the plane of said plate, said wedge being positioned intermediate said friction shoes, and spring means cooperating with said wedge to urge said friction shoes into engagement with said surfaces.

References Cited in the file of this patent

UNITED STATES PATENTS

| Number | Name | Date |
|---|---|---|
| 1,713,914 | O'Connor | May 21, 1929 |
| 1,947,056 | Oelkers | Feb. 13, 1934 |
| 2,059,503 | Webb | Nov. 3, 1936 |
| 2,118,006 | Couch | May 17, 1938 |
| 2,141,767 | Camp | Dec. 27, 1938 |
| 2,483,181 | Clasen | Sept. 27, 1949 |
| 2,483,375 | Tack | Sept. 27, 1949 |
| 2,497,829 | Baslet | Feb. 14, 1950 |
| 2,682,397 | Clasen | June 29, 1954 |